Aug. 6, 1929.  H. B. HODGSON  1,723,421
RAIL JOINT
Filed Sept. 6, 1928   3 Sheets-Sheet 2
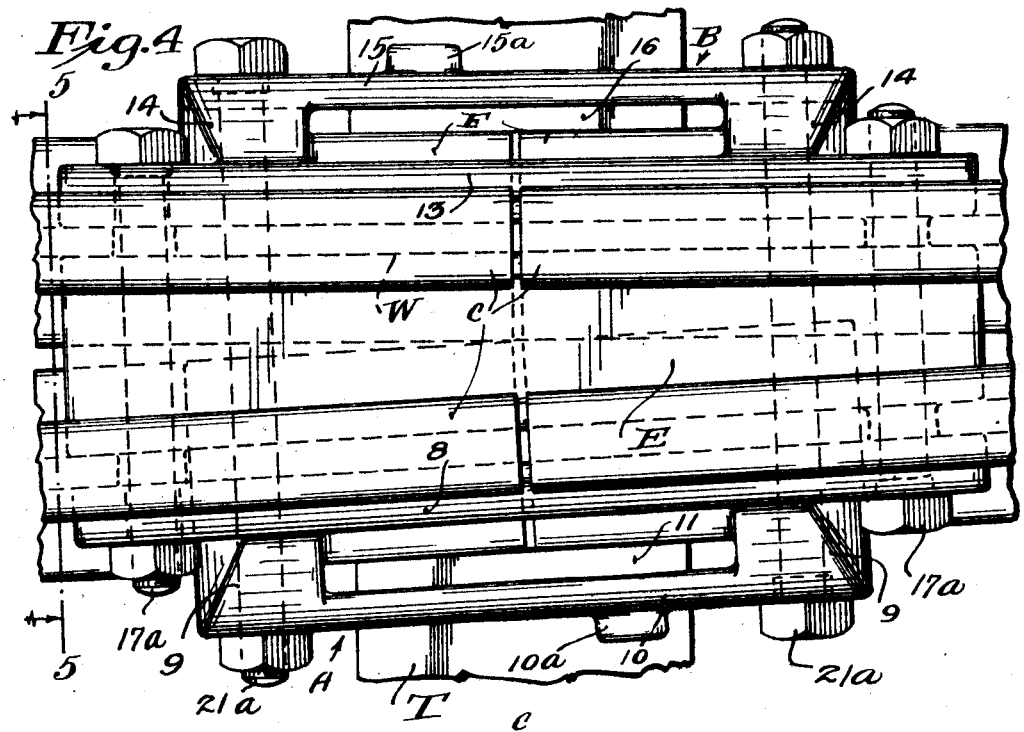
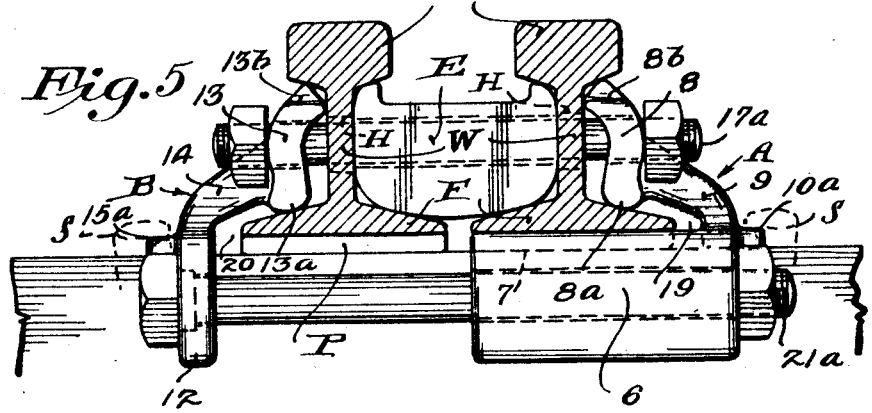
Inventor
Hugh B. Hodgson
By his Attorneys
Williamson Reybold Williamson Aug. 6, 1929.  H. B. HODGSON  1,723,421
RAIL JOINT
Filed Sept. 6, 1928  3 Sheets-Sheet 3

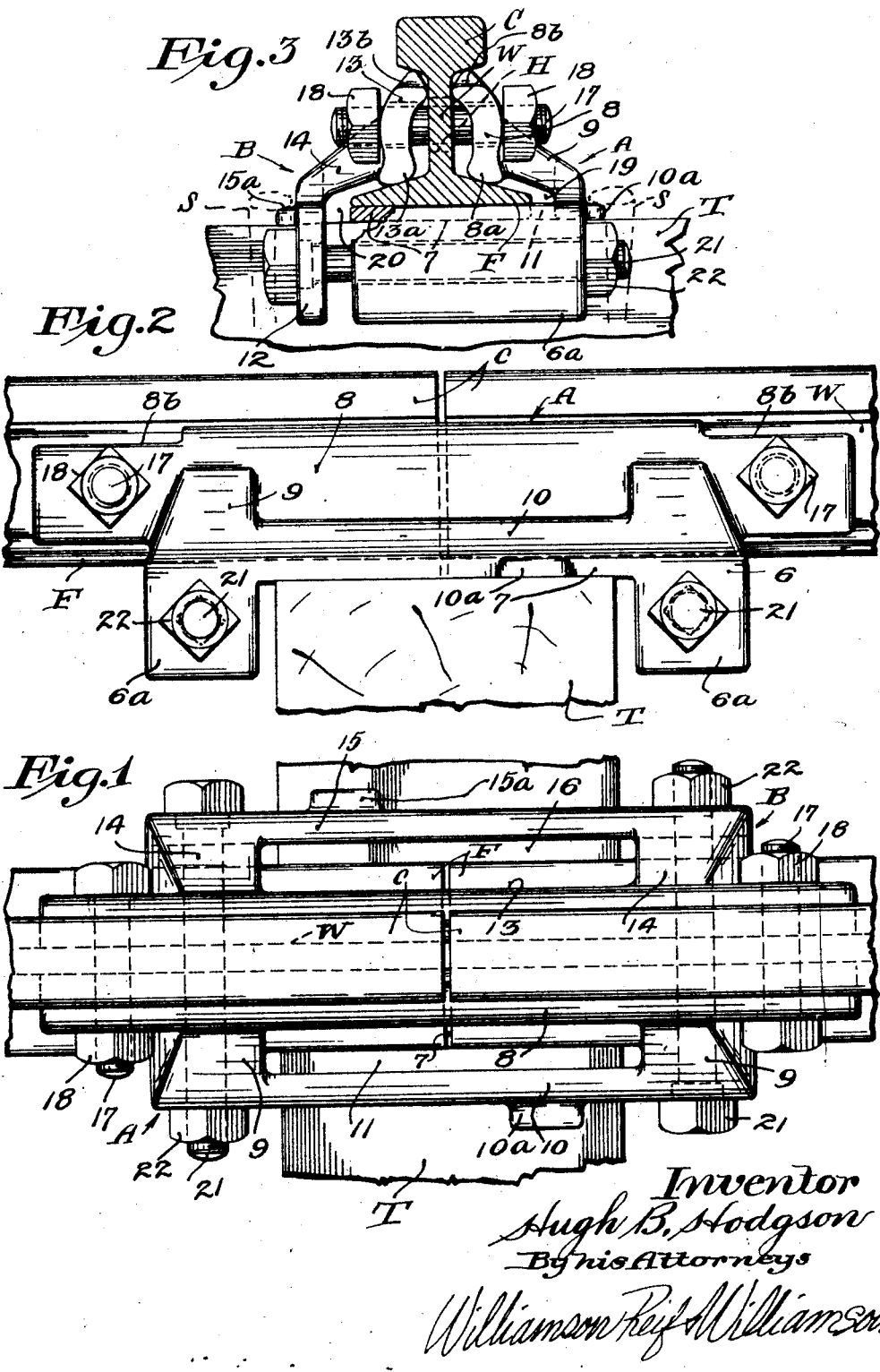

Inventor
Hugh B. Hodgson
By his Attorneys

Patented Aug. 6, 1929.

1,723,421

UNITED STATES PATENT OFFICE.

HUGH B. HODGSON, OF MOBRIDGE, SOUTH DAKOTA.

RAIL JOINT.

Application filed September 6, 1928. Serial No. 304,288.

This invention relates to joints for railroad rails and has for an object to provide a comparatively simple, but highly efficient rail joint adapted to be quickly and easily applied, and capable of use for a permanent or emergency joint and applicable between or over the ties.

Another object of the invention is to provide a highly efficient rail joint which will securely clamp the ends of a pair of rails together without employing a plurality of bolts passing through the web of each rail, which will permit expansion and contraction of the rails due to variation in temperature, and which will distribute pressures and strains throughout the flange, web and head of the rail.

Another object is to provide a rail joint which is equally applicable for joining a pair of rails together, or in conjunction for use in the construction of flanges, switches and turnouts.

A further object is to provide a rail joint of practically universal application for use in joining a pair of rails of different weights and heights, and especially adaptable for joining rails in bridge or culvert construction.

It is still a further object to provide a rail joint, wherein it is only necessary to pass one bolt through the end of each of the two rails joined.

More specifically, it is an object to provide a rail joint comprising a pair of co-operating clamping members, one of which has a base adapted to underlie and support the rails, and the other of which has a depending portion adapted to be clamped with the base portion of said first mentioned clamping member, said clamping members carrying elongated fish plates which apply and distribute pressure evenly against the flange, web and head of the rails.

These and other objects and advantages of the invention will be apparent from the following description made in connection with the accompanying drawings, in which like reference characters refer to similar parts throughout the several views, and in which—

Fig. 1 is a plan view of an embodiment of my invention applied to a pair of rails;

Fig. 2 is a side elevation of the same;

Fig. 3 is a cross section taken through the rail showing my device in end elevation;

Fig. 4 is a plan view showing my rail joint in use in co-operation with a filler block, for joining rails in the heel of a switch;

Fig. 5 is a cross section taken on the line 5—5 of Fig. 4, showing my device in end elevation.

Figure 6:
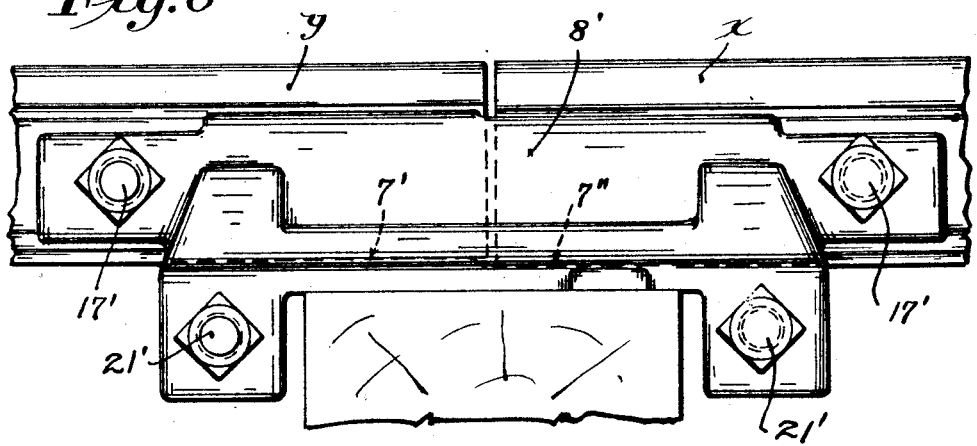
Figs. 6 and 7 illustrate a side elevation and a plan view respectively of my joint, modified slightly for the purpose of joining rails of unequal sizes and weights.

As illustrated, my rail joint comprises a pair of heavy clamping members designated as entireties by the letters A and B, which are adapted to co-operate when clamped together by suitable means to secure the ends of a pair of rails together, or to secure the ends of two pairs of rails together, when used in switch, frog or turnout construction in co-operation with suitable filler blocks. The co-operating clamping members A and B may be constructed of any suitable steel or iron which has a slight degree of resiliency, for the purpose to be later described.

The heavier clamping member A is provided with a thick inverted U-shaped base 6 forming a pair of spaced depending blocks 6ª adapted, if desired, to straddle a rail and leaving a horizontal rail support 7 extending between said blocks, which is adapted to underlie the flanges of the rails to be joined. Base 6 carries an elongated fish plate 8 which is preferably integrally formed therewith and connected thereto by heavy inclined arm 9 extending upwardly and inwardly from the outer edge of said base, said arms being spaced apart and overlying the spaced base blocks 6ª. A horizontal upstanding flange 10 connects arms 9, and is disposed above the outer edge of the rail support 7, and adjacent said flange a slot or elongated aperture 11 is formed through the rail support 7.

The fish plate 8 is concavo-convex in cross section and is somewhat widened and rounded at its base 8ª, said base being adapted to engage and exert pressure against the thickened portion of the flange of the rail. The upper edge of the fish plate A has slightly rounded corners, the inner corner being adapted to engage against the web W of the rail and the outer corner being adapted to engage beneath the head C of the rail. The end portions of the upper edges are offset or recessed at 8ᵇ, so that the ends of the fish plate will not engage the head of the rail for a purpose to be later described.

My clamping member B comprises a depending inverted U-shaped strap 12 of similar shape in side elevation to the U-shaped base 6 of clamping member A, and a fish plate 13 preferably integrally formed with the strap 12 is carried thereby, being of similar construction to the fish plate 8 carried by clamping member A. Fish plate 13 is, of course, adapted to engage the rail, at the opposite side of fish plate 8 and, like fish plate 8, has a widened base 13ᵃ adapted to engage the thickened portion of the flange F of the rail and an upper portion having inner and outer corners engaging the web and head of the rail respectively. Fish plate 13 is integrally connected with strap 12 by means of inclined arms 14 of similar construction in shape, to the arms 9 of clamping member A, and the arms are reinforced by means of a flange or bar 15 of similar shape to the flange 10 of member A. An elongated slot or aperture 16 is formed in member B disposed adjacent and inwardly of bar 15, said aperture corresponding with the aperture 11 in member A.

Oppositely alined bolt holes are formed in the ends of fish plates 8 and 13 through which heavy clamping bolts 17 are adapted to extend, said bolts passing through large holes H formed through the web of the rails, one of said enlarged holes only being formed in each of the two rails to be joined. The holes in the web of the rails are of such diameter that there will be adequate clearance for the bolts and consequently no pressure can be placed upon the bolts when a train passes over the rails, or during expansion or contraction of the rails due to variation in temperature. I prefer to reverse the two bolts utilized for clamping fish plates, as clearly shown in Fig. 1.

Sufficient clearance spaces 19 and 20 are left between the arms 9 and the outer edge of the rail flange F, and between the arms 14 and the adjacent outer edge of the rail flange F to prevent the clamping members from engaging said outer edges of the flange when they are drawn together.

The base blocks 6ᵃ have elongated horizontal bolt holes therethrough extending transversely to the rail which are alined with bolt holes through the depending portions of the strap 12 of member B, and through said corresponding bolt holes of said members A and B, elongated heavy clamping bolts 21 extend, said bolts preferably having square or polygonal-shaped portions adjacent their heads which are adapted to non-rotatably engage sockets formed adjacent the outer ends of the bolt holes, as clearly shown in dotted lines in Fig. 1, and the holes are preferably reversed as shown in said view. Suitable clamping nuts 22 threadedly engage the ends of bolts 21.

I prefer to provide relatively small outwardly extending toes 10ᵃ and 15ᵃ respectively, on the medial portions of the flange 10 and bar 15, which toes are adapted to be engaged by the heads of the ordinary railroad spikes S shown in dotted lines in Fig. 3 when it is desired to spike the joint to a tie T. The functions and advantages of my improved rail joint may be briefly described as follows:

The clamping members A and B may be applied either over the tie, as shown in the drawings, or between the ties. It will thus be obvious that the device may be utilized, not only as a permanent joint, but very successfully as an emergency joint, when a rail becomes fractured, especially since it may be applied very quickly.

As shown in the drawings, the clamping members A and B straddle a tie, the heavier clamping member A having its base portion 6 disposed beneath the ends of the rails to be joined. The base of the rail rests on the horizontal support 7 and the edges of the flanges are spaced from the members A and B, sufficient clearance being provided at 19 and 20, as heretofore set forth. After the clamping members are loosely positioned at opposite sides of the rail with the bolt holes alined, the large bolts 21 are inserted being reversed, as shown in Fig. 1, and said bolts being non-rotatably held in the sockets provided in the blocks 6ᵃ and in the depending portion of straps 12. The nuts 22 are then applied and the clamping members are drawn together. The shorter bolts 17 are then applied through the corresponding bolt holes in the fish plates and the nuts 18 applied to the threaded ends. All bolts are then tightened, causing the fish plates to simultaneously apply pressure against the thickened portion of the flange of the rail, against the upper portion of the web of the rail and against the under side of the head of the rail. The members A and B, as stated, are constructed of suitable steel or iron having some degree of resiliency, whereby the fish plates A and arms 9 will yield slightly as the several bolts are tightened, causing the lower edges or bases of the fish plates to be brought closer in towards the flange of the rail and also causing the upper edges of the fish plates to tend to raise the rail. The rail is thus securely clamped between the two clamping members A and B, and it will be seen that no part of the web of the rail can exert any pressure against the two bolts which pass through the rail, and that adequate clearance is supplied for expansion or contraction of the rail due to variations in temperature without placing a sheering strain upon the bolts.

Where the clamping members are applied over a tie, it will be seen that the rails cannot creep to any appreciable extent since the blocks 6ª straddle the ties. It will, however, be seen that my device is equally applicable to joints in rails or emergency joints between ties. For bridge or culvert construction the utility of my device will be apparent to those skilled in the arts, since the base 6 straddles the tie and prevents creepage.

The importance of the horizontal shelf or rail support 7, extending the entire length of the elongated base of the member A, cannot be overlooked in its co-operation with the clamping elements or fish plates. The joint is greatly reinforced and supported at the under side of the flange of the rail for a considerable distance by the shelf 7.

While in Figs. 1 to 3, inclusive, the device is illustrated in application to a pair of rails of similar construction, the joint can be equally well applied to join two rails of different weights and heights.

In Figs. 4 and 5, the application of my rail joint is illustrated for use in joining a pair of rails in the heels of switches, frogs or turnouts. As illustrated, a suitable filler block E is used in connection with my clamping members A and B, said filler block fitting between and properly spacing the two diverging tracks. Filler block E preferably has a recessed upper surface to accommodate the flanges of the car wheels. The base 6 underlies one of the rails, while a suitable plate P of equal thickness to the horizontal support 7 is placed between the rails of the other track and a tie. Considerably longer clamping bolts 21ª and 17ª are necessitated for clamping the co-operating members A and B together, but the clamping action, functions and distribution of pressure to the rails is identical with the application of my device to a single pair of rails.

Figure 7:
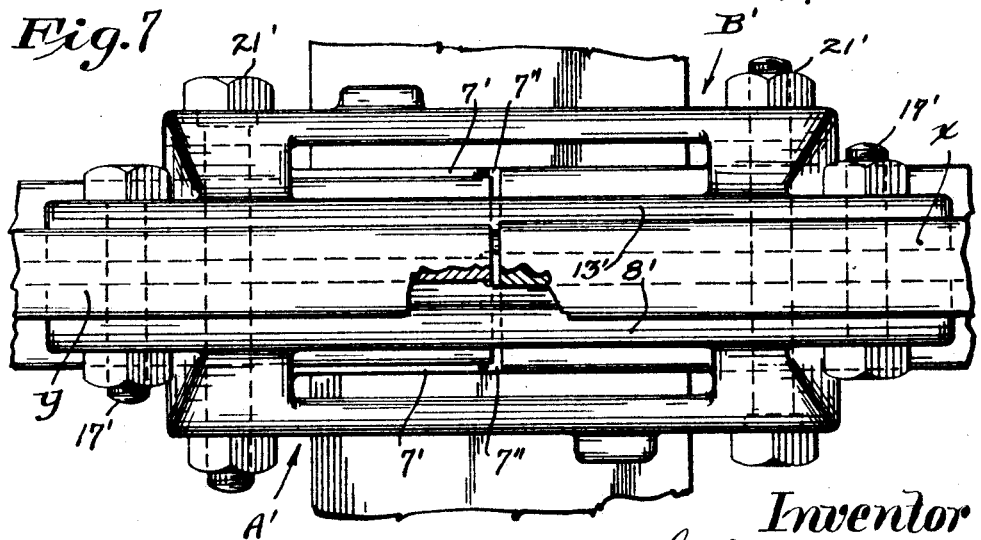

In Figs. 6 and 7, an embodiment of my invention is illustrated for special application in joining a pair of rails of unequal weights and sizes. As illustrated, an eighty-five pound rail X is joined with a seventy-five pound rail Y. The two clamping members, designated as entireties by the letters A' and B' respectively are modified from the structure shown in Figs. 1 to 3, inclusive as follows:—

Each of the members A' and B' has one-half of its body proportioned to snugly engage the heavier, or as shown, the eighty-five pound rail and half of its body proportioned and formed to snugly engage the lighter, or as shown, the seventy-five pound rail Y. The dividing lines for the differently proportioned halves of each member A' and B' are disposed medially and vertically of the two clamping members. Thus, the shelf or support for the ends of the two rails to be joined has a slightly raised portion 7' and a slightly depressed portion 7" for the heavier rail and the fish plates 8' and 13' respectively have offset portions, as shown in Fig. 6 to properly engage the heavier and lighter rails, said portions also being of slightly different weights in order that the under side of the head of the rails, the web, and the flange may be simultaneously engaged by the fish plates in accordance with the principles and scope of this invention. This structure, of course, requires a special joint for use in joining rails of unequal weights and sizes. With the structure above described, the clamping bolts 21' and 17' may be applied in the manner described in connection with the embodiment of the invention illustrated in Figs. 1 to 3 to tightly and efficiently clamp the ends of the rails X and Y together and the joint may be formed over the tie, as illustrated in Figs. 6 and 7, or between a pair of ties.

The apertures 11 and 16 in members A and B permit sand and other material to work through the clamping members and prevent the same from lodging or working beneath the rail. The concavo-convex structure of fish plates permits electrical wires for signals etc., to pass through the joint without interference from the clamping action of the members A and B.

From the foregoing description, it will be seen that I have invented a comparatively simple, but highly efficient rail joint for permanent or emergency use in joining rails together. This device can be used over a tie, straddling the same, and preventing creepage of the rail, or it can be used as an emergency joint between the ties. It has also been shown that the device is highly efficient for joining rails in the heels of switches, frogs and turnouts.

It will, of course, be understood that various changes may be made in the form, details, arrangement and proportions of the parts without departing from the scope of applicant's invention.

What is claimed is:

1. In a joint for rails, a pair of cooperating clamping members adapted to be disposed at opposite sides of the meeting ends of a pair of rails, said clamping members having opposed base portions spaced apart and having overhanging inwardly extending portions spaced above the flanges of the rails and each having an elongated fish-plate portion integrally formed with said overhanging portion, said fish-plate portions being adapted to engage opposite sides of the flange, web and head of the rail to distribute the clamping pressure, bolts extending through said fish-plate portions and the web of the rail for clamping the same and clamping bolts passing through the opposed base portions of said clamping members.

2. In a joint for rails, a pair of cooperating clamping members adapted to be disposed at opposite sides of the meeting ends of a pair of rails, said clamping members having opposed and spaced base portions depending below the flanges of the rails, one of said base portions underlying and supporting the flanges of the rails, said clamping members each having inwardly projecting overhanging portions spaced above the upper surface of the flanges of the rails and elongated fish-plate portions integrally formed therewith, said fish-plate portions engaging the opposite sides of the flange, web and head of the rails to distribute the clamping pressure and clamping bolts extending through the opposed and spaced base portions below the rail.

3. The structure set forth in claim 2, wherein said fish-plate portions and said overhanging portions of said clamping members are resilient and clamping bolts extending through the web of said rails and said fish-plate portions.

In testimony whereof I affix my signature.

HUGH B. HODGSON.